United States Patent
Rothermel et al.

(10) Patent No.: US 10,491,472 B2
(45) Date of Patent: Nov. 26, 2019

(54) COORDINATING WIDTH CHANGES FOR AN ACTIVE NETWORK LINK

(71) Applicant: INTEL CORPORATION, Santa Clara, CA (US)

(72) Inventors: Brent R. Rothermel, Pottstown, PA (US); Mark S. Birrittella, Chippewa Falls, WI (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/129,386

(22) PCT Filed: Sep. 26, 2015

(86) PCT No.: PCT/US2015/052517
§ 371 (c)(1),
(2) Date: Sep. 26, 2016

(87) PCT Pub. No.: WO2017/052664
PCT Pub. Date: Mar. 30, 2017

(65) Prior Publication Data
US 2018/0191570 A1    Jul. 5, 2018

(51) Int. Cl.
*H04L 12/24* (2006.01)
*H04L 12/931* (2013.01)
*H04L 12/841* (2013.01)
*H04L 12/939* (2013.01)

(52) U.S. Cl.
CPC ...... *H04L 41/0816* (2013.01); *H04L 41/0893* (2013.01); *H04L 47/283* (2013.01); *H04L 49/70* (2013.01); *H04L 49/557* (2013.01)

(58) Field of Classification Search
CPC ......... H04L 47/10; H04L 47/12; H04L 47/20; H04L 47/24; H04L 47/32; H04L 47/38; H04L 47/70; H04L 47/72; H04L 47/74; H04L 47/78; H04L 47/80; H04L 47/22; H04L 47/225; H04L 47/18; H04L 47/52; H04W 28/02
See application file for complete search history.

(56) References Cited

U.S. PATENT DOCUMENTS

| | | |
|---|---|---|
| 2008/0091963 A1 | 4/2008 | Cherukuri et al. |
| 2013/0007491 A1 | 1/2013 | Iyer et al. |
| 2013/0051397 A1 | 2/2013 | Guo et al. |
| 2015/0081921 A1* | 3/2015 | Cherukuri ........... G06F 13/4265 709/228 |
| 2015/0180782 A1 | 6/2015 | Rimmer et al. |

OTHER PUBLICATIONS

International Search Report and Written Opinion received for PCT Patent Application No. PCT/US2015/052517, dated Jul. 8, 2016, 13 pages.

* cited by examiner

*Primary Examiner* — Dady Chery

(57) ABSTRACT

Various embodiments are generally directed to dynamically changing a width of a network link without inactivating the network link. Provided are component communicatively coupled via a network link configured to negotiate a new network link width and to initiate a soft recovery of the network link to implement the new negotiated link width.

19 Claims, 9 Drawing Sheets

COORDINATING WIDTH CHANGES FOR AN ACTIVE NETWORK LINK

TECHNICAL FIELD

Embodiments described herein generally relate to networks and particularly to networking protocols that utilize a series of parallel lanes to communicate.

BACKGROUND

Many networking protocols utilize a set of parallel lanes to communicate serial data at a higher rate of speed versus single lane configurations. In particular, a network link may be established to include a number of lanes. The number of lanes may be referred to as the "width" of the link. Changing the link width while the link is active typically disrupts network traffic. More specifically, during operation, if the link width is changed, the link must either be taken down to change the width or a significant interruption in network traffic results from reconfiguring the link width.

DETAILED DESCRIPTION

As contemplated in the present disclosure, a network link width may be changed during operation of the link without taking the link down and without a significant disruption to network traffic. In general, a network link width change may be implemented for an active network link by negotiating the network link width change using idle messages (or idle flits). Idle messages may be transmitted opportunistically in gaps between the network traffic, thereby providing the network link to continue to communicate data while the new link width is negotiated.

With some examples, a network link width may be requested externally, for example, by a power management component of the system, by a network fabric manager, or the like. In some examples, a network link width change may be dictated by a network policy, or the like. Upon receiving a request to change a network link, a network component may initiate the network link width change by sending the request to a network component partner. In particular, the network component may send an idle message to the network component partner, the idle message to include an indication to change the link width. The link width change may be further negotiated via idle messages while network link traffic is continued to be communicated between the network component and the network component partner. Once the network link width change is negotiated, a network link recovery (e.g., a soft network link recovery, or the like) is initiated whereby network traffic is paused for the duration of two round trips over the network link.

Figure 1:
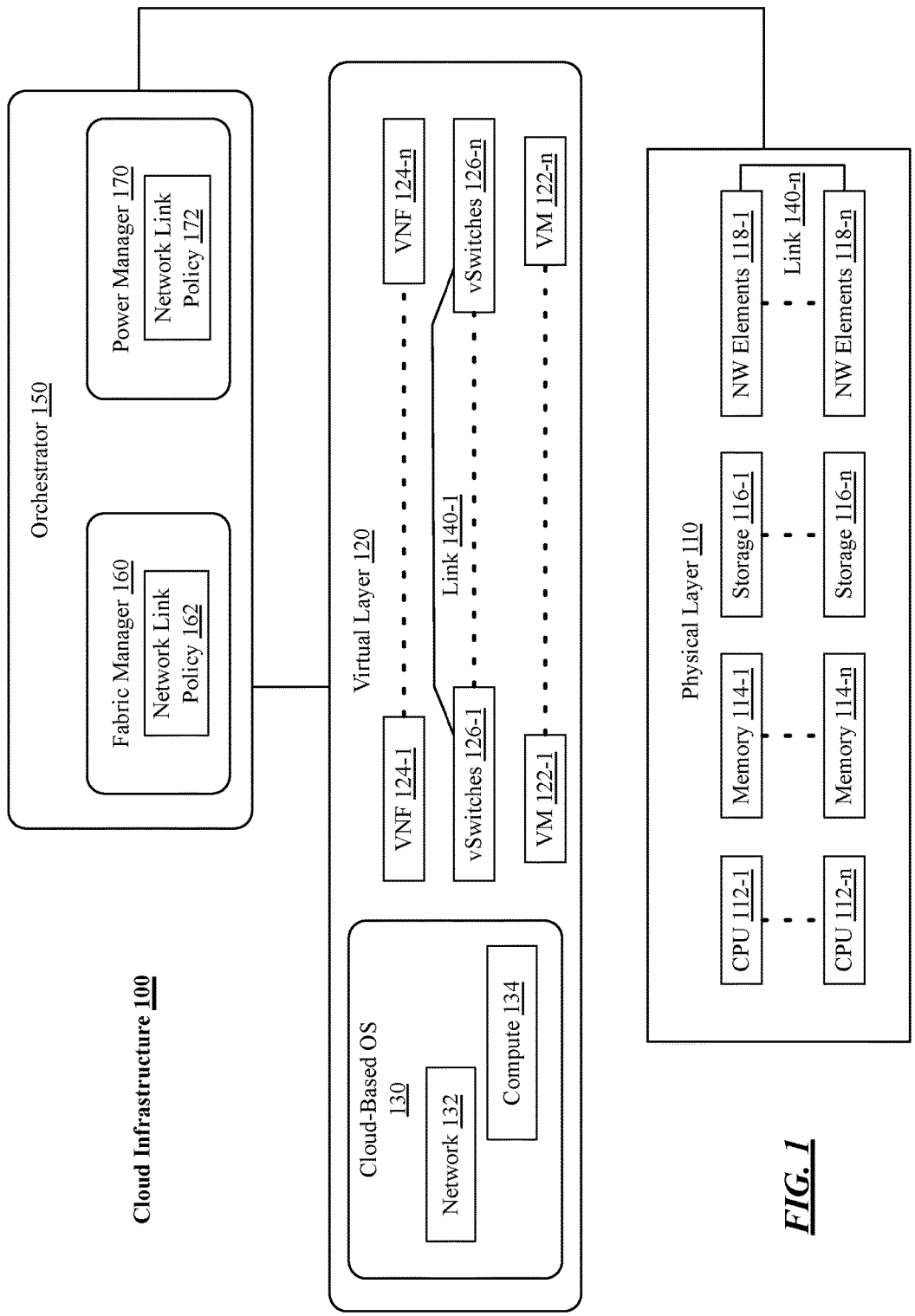
FIG. 1 illustrates an example wireless network according to an embodiment.

FIG. 1 illustrates an example cloud infrastructure 100, arranged according to at least some embodiments of the present disclosure. In some examples, as shown in FIG. 1, cloud infrastructure 100 includes a physical layer 110 and a virtual layer 120. The physical layer 110 and the virtual layer 120 include various elements that may be interconnected to implement various functions or computing configurations. In general, the virtual layer 120 operates using the computing resources of the physical layer 110.

The physical layer 110 may be implemented in any of a variety of computing devices, such as, for example, servers, data centers, distributed computing systems, etc. The physical layer 110 may include CPUs 112-1 to 112-n, where "n" is any positive integer greater than 1. CPUs 112-1 to 112-n may individually represent single microprocessors or may represent separate cores of a multi-core microprocessor. The physical layer 110 may also include memory 114-1 to 114-n. Memory 114-1 to 114-n may represent various types of memory devices such as, but not limited to, dynamic random access memory (DRAM) devices that may be included in dual in-line memory modules (DIMMs) or other configurations. The physical layer 110 may also include storage 116-1 to 116-n. Storage 116-1 to 116-n may represent various types of storage devices such as hard disk drives or solid state disk drives. The physical layer 110 may also include network (NW) elements 118-1 to 118-n. NW elements 118-1 to 118-n may include network interface cards (NICs), switches, or the like having one or more NW ports for network connections for NWs within cloud infrastructure 100 or external to cloud infrastructure 100 and to route data via either internal or external network links for elements of cloud infrastructure 100. It is noted, that the elements (e.g., CPUs 112-1 to 112-n, memory 114-1 to 114-n, etc.) can be grouped into logical arrangements to form, for example, a server grouping or server cluster upon which at least a portion of the virtual layer 120 may execute.

In general, the virtual layer 120 may abstract the hardware of the physical layer 110 to provide virtual computing resources. In particular, the virtual layer 120 may implement a virtual machine (VM) or a number of VMs that can be used to process any number or type of computing workloads. For example, the virtual layer 120 may include VMs 122-1 to 122-n, which can be implemented to perform email processing, web server processing, graphics processing, database processing, service provider traffic, or the like utilizing the computing resources of the physical layer 110.

The virtual layer 120 may also include VNFs 124-1 to 124-n to provide various network functions. For example, one or more of the VNFs 124-1 to 124-n may implement an intrusion prevention system (IPS), a firewall (FW), data loss prevention (DLP), load balancers, network accelerators, 3GPP Evolved Packet Core components (e.g., a mobile management entity (MME),) packet data network (PDN) gateway, or the like.

Additionally, the virtual layer 120 may include a number of virtual switches (vSwitches) 126-1 to 126-n to provide connectivity between VMs 122-1 to 122-n, VNFs 124-1 to 124-n, other virtual containers (not shown), and/or other components of the cloud infrastructure 100. In particular, the vSwitches 126-1 to 126-n route data between elements of the virtual layer 120 and/or the physical layer 110.

A cloud-based operating system (OS) 130 may be included in the virtual layer 120. In general, the cloud-based OS 130 provides an execution environment for executing the workloads on the VMs 122-1 to 122-*n*. It is to be appreciated, that more than one cloud-based OS 130 may be implemented in the virtual layer 120. However, for purposes of clarity, only the cloud-based OS 130 is shown. The cloud-based OS 130 can include network portions 132 and compute portions 134. With various examples, the cloud-based OS 130 can be any of a number of operating systems configured to execute and/or operate on SDI. For example, the cloud-based OS 130 can be Openstack®, Cloud Stack®, VmWare®, WindRiver®, or the like). With some examples, the cloud-based OS 130 may be configured to use secure HTTP-based REST APIs. This is described in greater detail in the ETSI standards referenced above.

The components of the cloud infrastructure 100 may be, at least partially, interconnected via network links. In particular, network links 140-1 to 140-*n* are depicted. It is important to note, that any number of network links 140-1 to 140-*n* may be implemented. Additionally, the network links 140-1 to 140-*n* may be implemented between any combination of the various network elements in the infrastructure 100, such as, for example, the vSwitches 126-1 to 126-*n*, the NW elements 118-1 to 118-*n*. For example, network links 140-1 to 140-*n* may be implemented between two of the vSwitches 126-1 to 126-*n*, between two of the NW elements 118-1 to 118-*n*, or between one of the vSwitches 126-1 to 126-*n* and one of the NW elements 118-1 to 118-*n*. Additionally, with some examples, the network links 140-1 to 140-*n* may be peer-to-peer links.

As explained in greater detail below (e.g., refer to FIGS. 2-3) the network links 140-1 to 140-*n* may include a number of lanes, arranged in parallel, to communicate serial data in a high-speed manner. During operation, it may be desirable to change the lane width (e.g., the number of lanes in the link, the lane assignments, or the like). The present disclosure provides that the lane width may be modified without taking down, or inactivating, the network link.

The cloud infrastructure 100 further includes an orchestrator 150. The orchestrator 150 may include a fabric manager 152 and a power manager 154. In general, the orchestrator 150 is configured to provide supervisory and management functions for the infrastructure 100. The fabric manager 152 and the power manager 154 can include network link policies 156 and 158 respectively. The network link policies 156 and 158 may specify various protocols, procedures, parameters, or configurations for network links 140-1 to 140-*n*.

The fabric manager 152 and the power manager 154 can comprise computer executable instructions operative to cause the infrastructure 100 to perform the techniques described herein. The orchestrator 150, and particularly, the fabric manager 152 and/or the power manger 154 may be communicatively coupled to portions of the physical layer 110 and the virtual layer 120. During operation, the fabric manager 152 and/or the power manager 154 may provision, configure, or implement network links 140-1 to 140-*n*. Subsequently, a width of one or more of the network links 140-1 to 140-*n* may be changed without taking the network link down.

Figure 2:
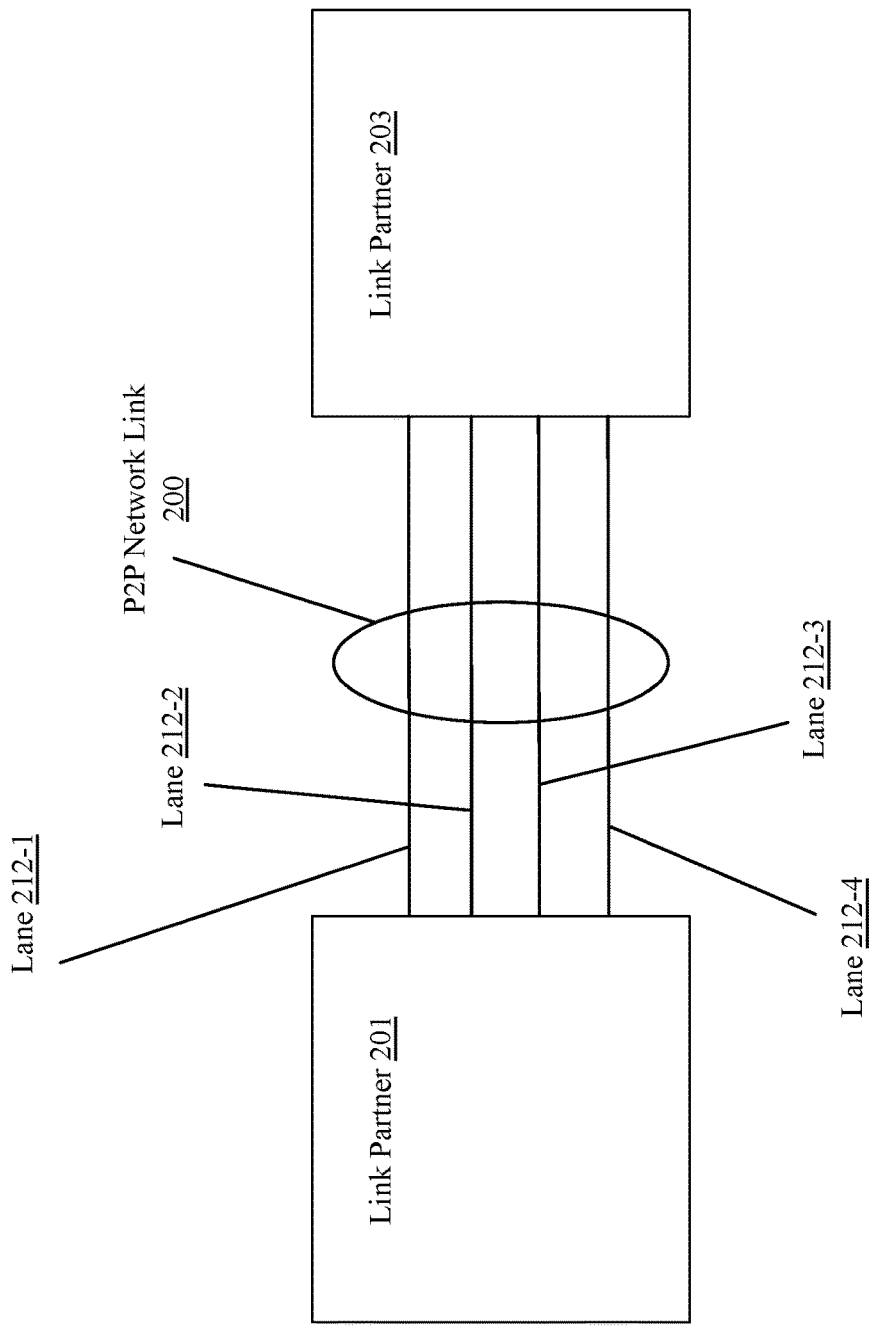
FIG. 2 illustrates an example wireless data transmission technique according to an embodiment.
Figure 3:
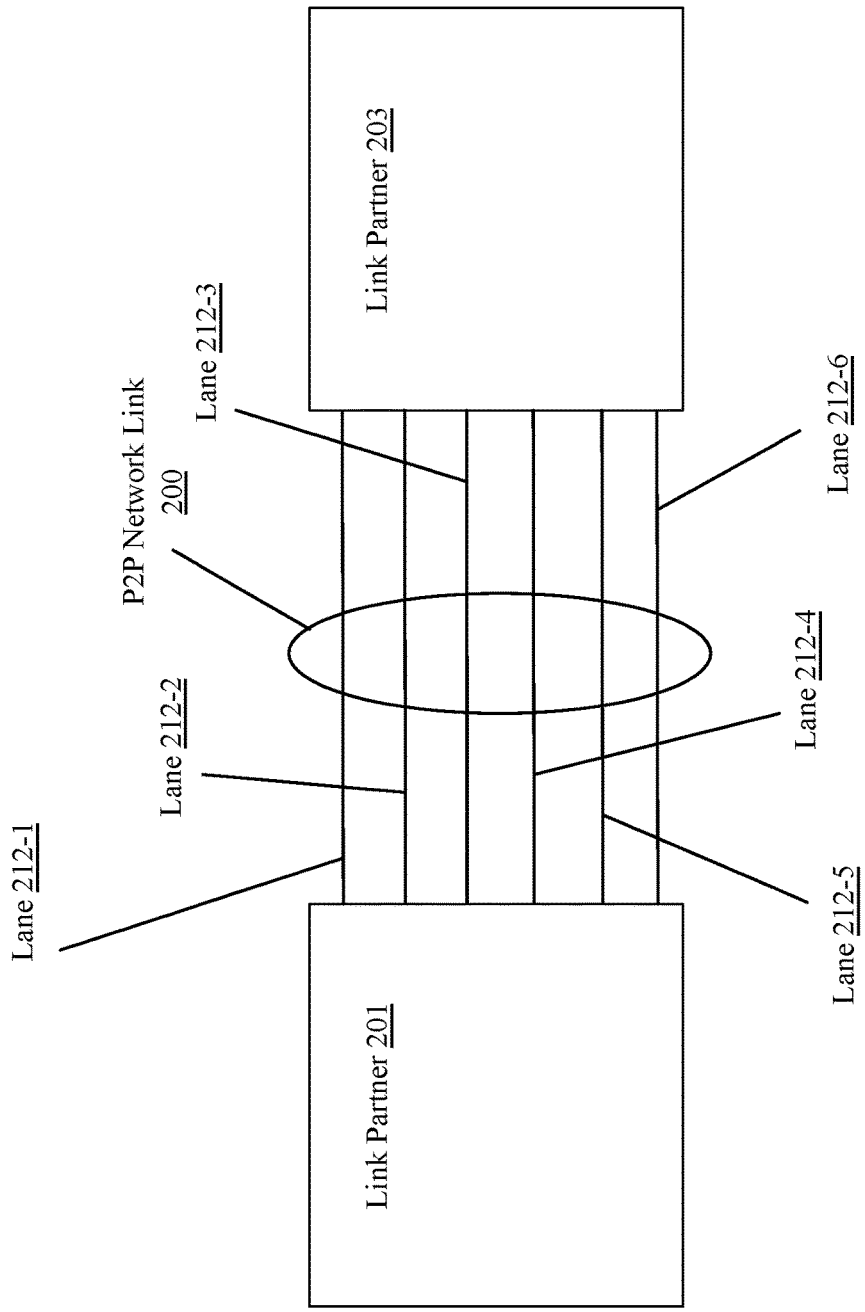
FIG. 3 illustrates an example transmitter node according to an embodiment.
Figure 4:
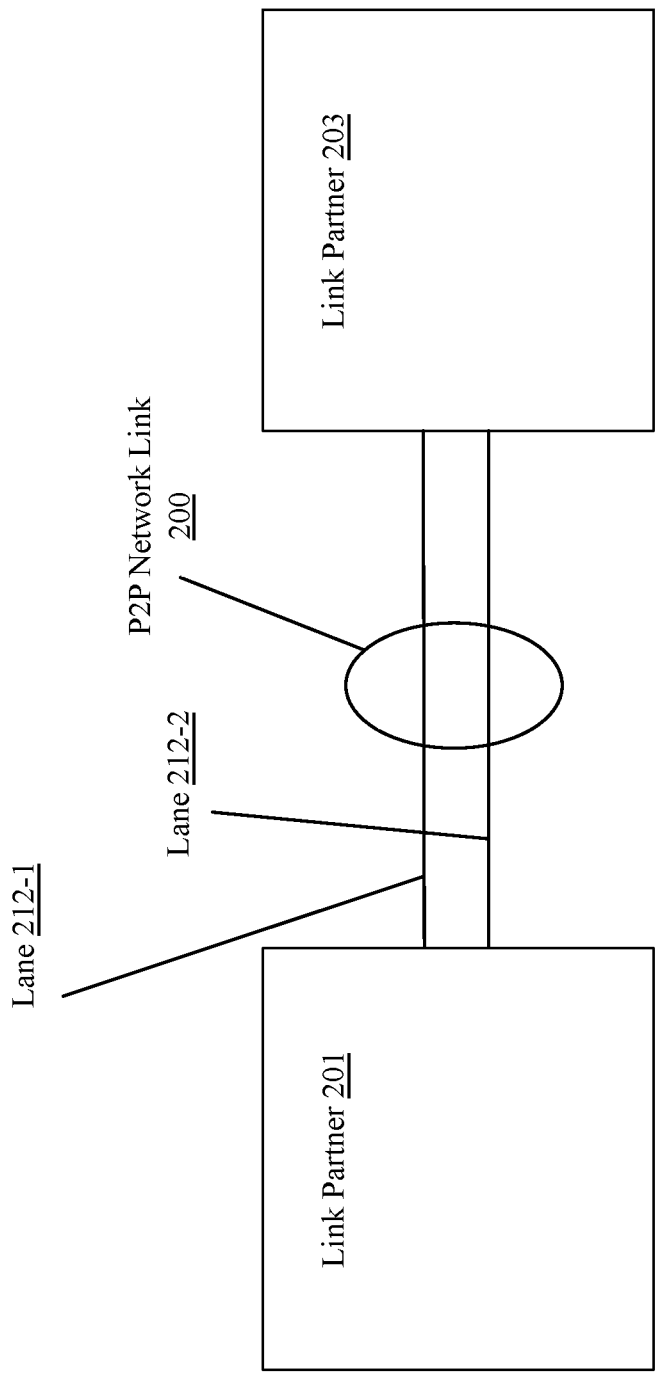
FIG. 4 illustrates an example receiver node according to an embodiment.

FIGS. 2-4 illustrate examples of a peer-to-peer (P2P) network link 200. In general, the P2P network link 200 may be one of the network links 140-1 to 140-*n* depicted in FIG. 1. As depicted, the P2P network link 200 communicatively connects link partners 201 and 203. It is noted, the P2P network link 200 may be formed between any one of the elements of the cloud infrastructure described above. As such, the link partners 201 and 203 may selected from any combination of the elements shown in FIG. 1. In particular, the P2P network link 200 may be formed between vSwitches 126-1 to 126-*n*, between NW elements 118-1 to 118-*n*, between one of the vSwitches 126-1 to 126-*n* and one of the NW elements 118-1 to 118-*n*, or the like.

Figure 5:
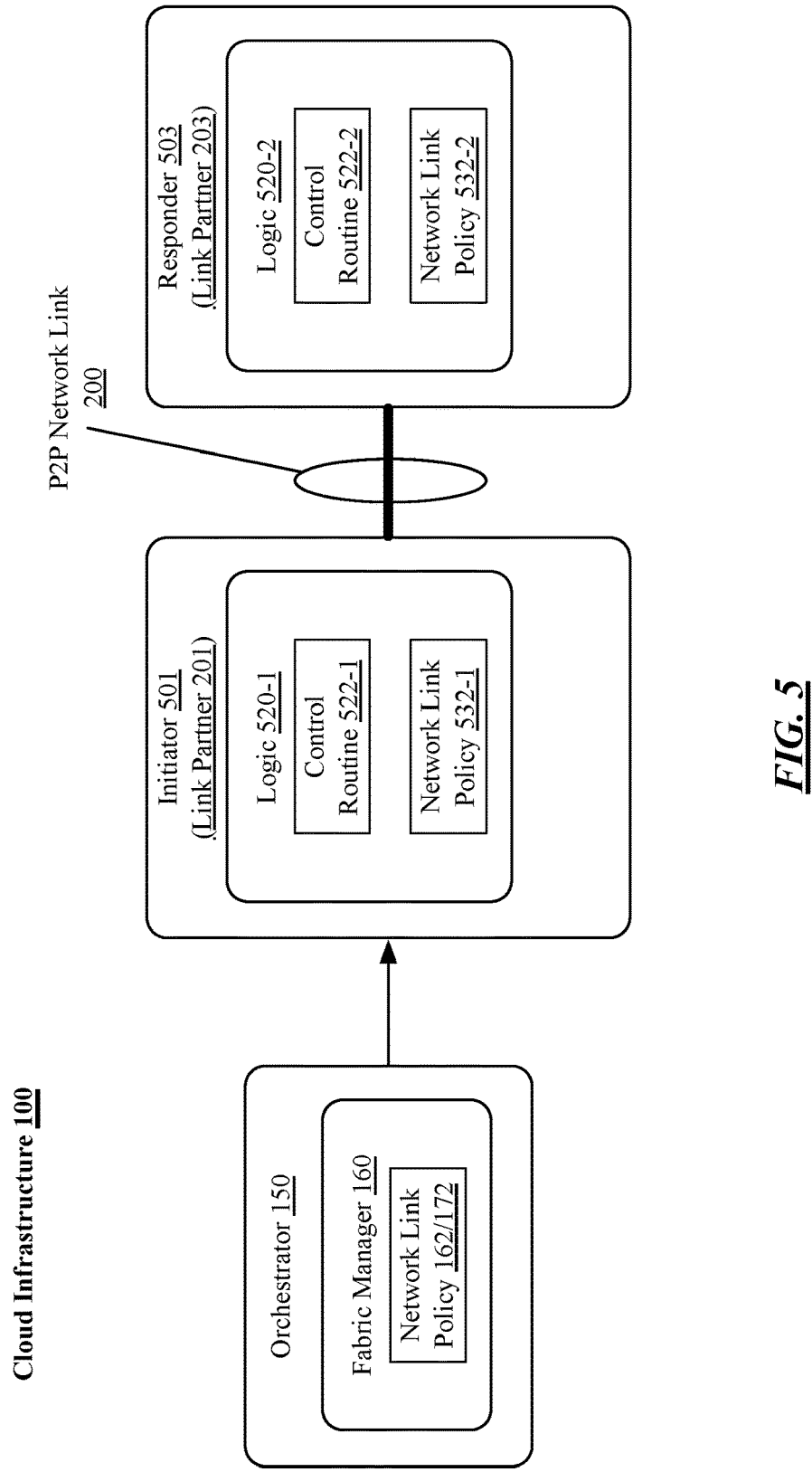
FIG. 5 illustrates an example method according to an embodiment.

The P2P network link 200 may be formed between the link partners 201 and 203 based on a network link policy (refer to FIG. 5). In general, the P2P network link 200 includes a number of link lanes 212-*a*. It is noted, that the P2P network link 200 may be formed to include any number of lanes 212-*a*. However, the number of lanes depicted here is chosen for purposes of clarity of presentation only and not to be limiting. Turning more specifically to FIG. 2, as depicted, the P2P network link 200 includes lanes 212-1, 212-2, 212-3, 212-4. During operation, the number of lanes, or the width, of the P2P network link 200 may be changed. In particular, the width of the P2P network link 200 may be dynamically changed during operation of the link without substantially interfering with the link traffic and without taking the P2P network link down. For example, turning more particularly to FIG. 3, the P2P network link 200 is depicted where the link width has changed from that depicted in FIG. 2. Specifically, this figure depicts the P2P network link 200 including lanes 212-1, 212-2, 212-3, 212-4, 212-5, and 212-6. As another example, turning more particularly to FIG. 4, the P2P network link 200 is depicted where the link width has changed from that depicted in FIGS. 2-3. Specifically, this figure depicts the P2P network link 200 including lanes 212-1 and 212-2.

FIG. 5 illustrates an example of a portion of the cloud infrastructure 100 of FIG. 1. In particular, this figure illustrates an example of link partners 201 and 203 communicatively coupled via P2P network link 200. As depicted, the link partners 201 and 203 may include a logic component 520 that itself includes a control routine 522 and link policy 530. In particular, link partner 201 includes logic component 520-1 and control routine 522-1 while link partner 203 includes logic component 520-2 and control routine 522-2. In general, the logic component may be any logic either physical or virtual, such as, for example, processing logic, memory logic, or the like. More particularly, the logic 520-*a* may be composed of at least portions of CPU 112-*a*, memory 114-*a*, and/or storage 116-*a*. The control routine 522-*a* can comprise computer executable instructions, operative on the logic 520-*a* to cause the logic 520-*a* to perform the techniques described herein.

Furthermore, the link partners 201 includes link policy 530-1 while the link partner 203 includes link policy 530-2. The link 200 may be negotiated by the link partners 201 and 203 based on their individual link policies. Additionally, during operation, one of the components to the P2P network link 200 (e.g., the link partner 201, the link partner 203, or the like) may initiate a link width change while the other component responds to the initiated link width change. Accordingly, for purposes of clarity, one of the components to the P2P network link 200 is depicted as the initiator while the other is depicted as the responder. In some examples, either of the components to the P2P network link 200 may be capable of acting as the initiator or the responder. However, for purposes of clarity, the link partner 201 is depicted as the initiator 501 while the link partner 203 is depicted as the responder 502.

In general, the initiator 501 receives an update to it's network link policy 530-1 that dictates a required change to width of the link 200. Based on the updated network link policy, the initiator 501 initiates the link width change and negotiates the change with the responder while maintaining the P2P network link 200 in an active state. More specifically, in executing the control routine 522-1, the logic 520-1 may receive an indication of a change to it's network link policy. For example, the initiator 501 may receive an information element from the orchestrator 150, from the fabric manager 160, or from the power manager 170. The received information element may include a network link policy, an update to a network link policy, or an indication to adjust the width of the P2P network link 200. For example, the initiator 501 may receive the network link policy 162 from the fabric manager 160, which dictates a change to the width of the P2P network link 200.

Figure 6:
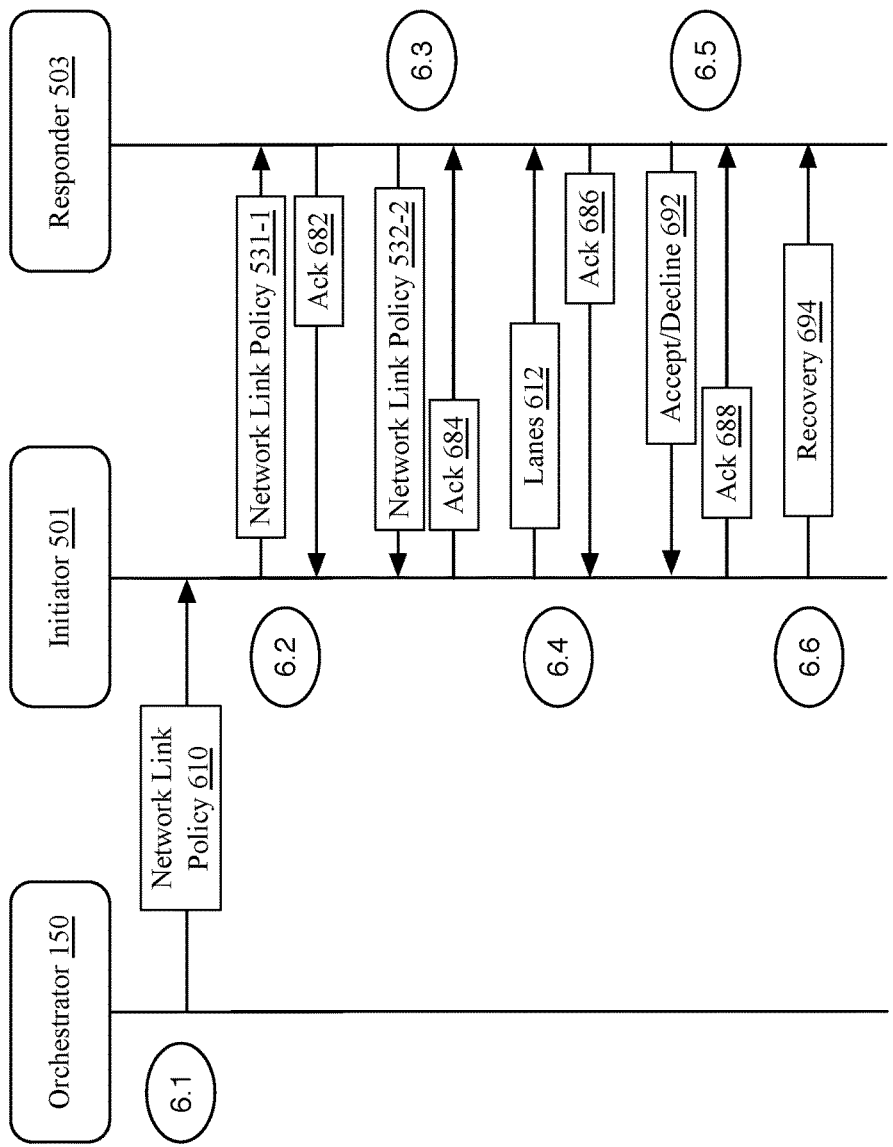
FIG. 6 illustrates another example method according to an embodiment.
Figure 7:
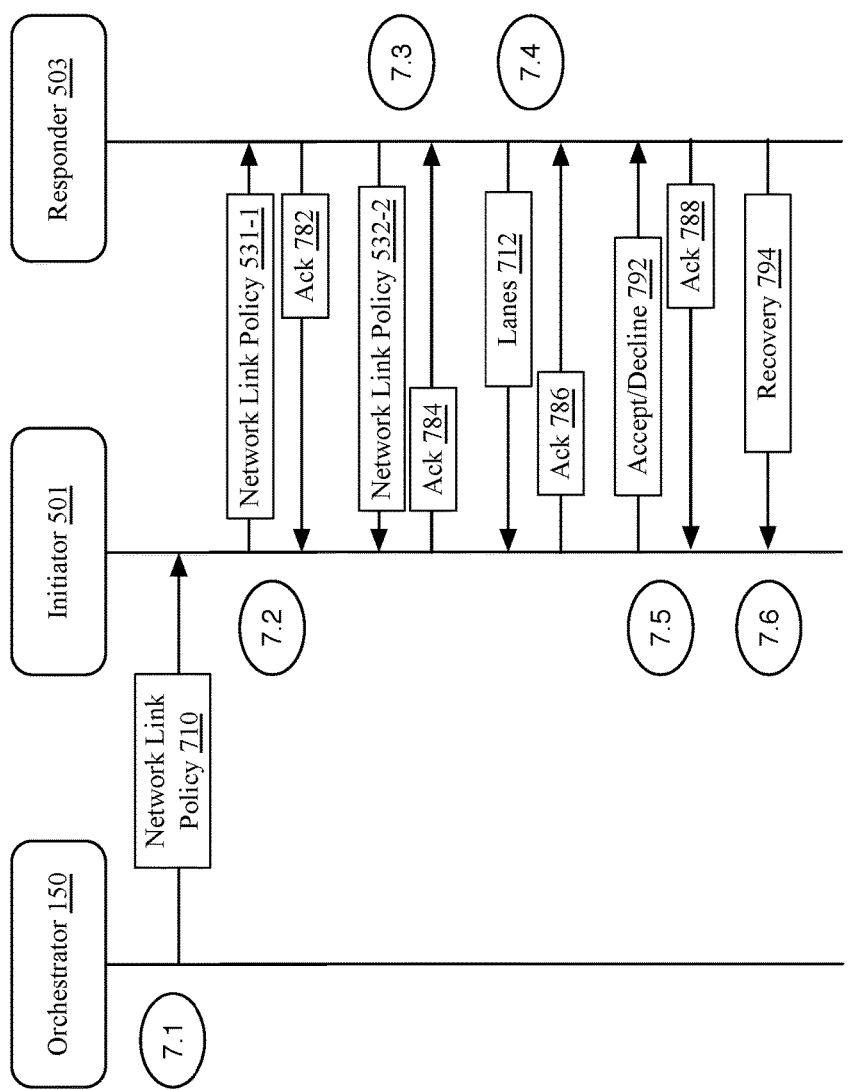
FIG. 7 illustrates another example wireless data transmission technique according to an embodiment.

FIGS. 6-7 illustrate example techniques for changing a P2P network link width, according to at least some examples of the present disclosure. The example techniques may be implemented by the infrastructure 100, to dynamically modify a network link width without taking the network link down. In general, FIG. 6 depicts an example where the initiator of the width change dictates the lanes while FIG. 7 depicts an example where the responder to the width change dictates the lanes.

Turning more particularly to FIG. 6, a technique 600 is depicted. The technique 600 may begin at step 6.1. At step 6.1, the orchestrator 150 may send an information element 610 to the initiator 501 (e.g., one of the vSwitches 126-*n*, one of the NW Elements 118-*n*, or the like), the information element to include an indication to change a width of a network link (e.g. the network link 140-*n*, 200, or the like). For example, the orchestrator 150 may send an information element to the initiator 501 to include a change to the initiator's network link policy (e.g., the link policy 530-1, or the like).

Continuing to step 6.2, the initiator 501 may inform the responder 503 of the new network link policy. Additionally, the initiator 501 may inform the responder 503 as to whether the initiator must dictate the lanes of the network link. For example, in executing the control routine 522-1, the logic 520-1 may send an information element to the responder 503 to include an indication of the initiator's network link policy 531-1, which may correspond to the new network link policy 610. In some examples, the information element sent by the initiator at step 6.2 may indicate whether the initiator 501 must dictate the link lanes. In some example, the initiator 501 may send the information element as an idle flit message. In particular, the the initiator 501 may send the information element during a period where no traffic is being sent over the P2P network link 200. It is noted, that an idle flit message may be communicated (e.g., sent, transmitted, or the like) over a network link either when no traffic is being communicated over the link or an idle flit message can be forced by local hardware (e.g., the initiator 501, the responder 503, or the like) either immediately or after a timeout has expired. In some examples, an idle flit may be an information element corresponding to a flow control digit (flit) or other such message, packet, portion of a packet, or the like used to send information between nodes (e.g., between link partners 201 and 203, between initiator 501 and responder 503, or the like).

Additionally, at step 6.2, the initiator 501 may receive an acknowledgment 682, for example, and idle flit acknowledgement, from the responder 503.

Continuing to step 6.3, the responder 503 may inform the initiator 501 of the responder's network link policy. Additionally, the responder 503 may inform the initiator 501 as to whether the responder must dictate the lanes of the network link. For example, in executing the control routine 522-2, the logic 520-2 may send an information element to the initiator 501 to include an indication of the network link policy 532-2 and whether the responder 503 must dictate the link lanes. In some example, the responder 503 may send the information element as an idle flit message. In particular, the the responder 503 may send the information element during a period where no traffic is being sent over the P2P network link 200. Additionally, at step 6.3, the responder 503 may receive an acknowledgment 684, for example, and idle flit acknowledgement, from the initiator 501.

Continuing to step 6.4, the initiator 501 may send in information element to the responder 503 to include an indication of the new lanes 612 for the network link. For example, in executing the control routine 522-1, the logic 520-1 may send an information element to the responder 503 to include an indication of the new network link lanes. In some example, the initiator 501 may send the information element as an idle flit message. In particular, the the initiator 501 may send the information element during a period where no traffic is being sent over the P2P network link 200. Additionally, at step 6.4, the initiator 501 may receive an acknowledgment 686, for example, and idle flit acknowledgement, from the responder 503.

Continuing to step 6.5, the responder 503 may accept or decline the new lanes dictated by the initiator 501. In general, in executing the control routine 522-2, the logic 520-2 may send an information element to the initiator 501 to include an indication of an acceptance (or a declination) of one or more lanes corresponding to a change of a width of a network link. For example, in executing the control routine 522-2, the logic 520-2 may send an information element to the initiator 501 to include an indication of whether the responder accepts or declines (e.g., the accept/decline 692) the new lanes (e.g., the lanes 612, or the like) dictated by the initiator. In some example, the responder 503 may send the information element as an idle flit message. In particular, the the responder 503 may send the information element during a period where no traffic is being sent over the P2P network link 200. Additionally, at step 6.5, the responder 503 may receive an acknowledgment 688, for example, and idle flit acknowledgement, from the initiator 501.

Continuing to step 6.6, the initiator 501 may force a recovery of the network link 200 if the responder 503 has agreed to the new lanes dictated by the initiator 501. Otherwise, the technique may return to step 6.4. For example, in executing the control routine 522-1, the logic 520-1 may force a recovery 694 of the network link 200 based on a determination that the responder has agreed to the newly dictated lanes, otherwise the logic 520-1 may return to step 6.4.

Turning more particularly to FIG. 7, a technique 700 is depicted. The technique 700 may begin at step 7.1. At step 7.1, the orchestrator 150 may send an information element 710 to the initiator 501 (e.g., one of the vSwitches 126-*n*, one of the NW Elements 118-*n*, or the like), the information element to include an indication to change a width of a network link (e.g. the network link 140-*n*, 200, or the like). For example, the orchestrator 150 may send an information element to the initiator 501 to include a change to the initiator's network link policy (e.g., the link policy 530-1, or the like).

Continuing to step 7.2, the initiator 501 may inform the responder 503 of the new network link policy. Additionally, the initiator 501 may inform the responder 503 as to whether the initiator must dictate the lanes of the network link. For example, in executing the control routine 522-1, the logic 520-1 may send an information element to the responder 503 to include an indication of the initiator's network link policy 531-1, which may correspond to the new network link policy 610. In some examples, the information element sent by the initiator at step 7.2 may indicate whether the initiator 501 must dictate the link lanes. In some example, the initiator 501 may send the information element as an idle flit message. In particular, the the initiator 501 may send the information element during a period where no traffic is being sent over the P2P network link 200. Additionally, at step 7.2, the initiator 501 may receive an acknowledgment 782, for example, and idle flit acknowledgement, from the responder 503.

Continuing to step 7.3, the responder 503 may inform the initiator 501 of the responder's network link policy. Additionally, the responder 503 may inform the initiator 501 as to whether the responder must dictate the lanes of the network link. For example, in executing the control routine 522-2, the logic 520-2 may send an information element to the initiator 501 to include an indication of the network link policy 532-2 and whether the responder 503 must dictate the link lanes. In some example, the responder 503 may send the information element as an idle flit message. In particular, the the responder 503 may send the information element during a period where no traffic is being sent over the P2P network link 200. Additionally, at step 7.3, the responder 503 may receive an acknowledgment 784, for example, and idle flit acknowledgement, from the initiator 501.

Continuing to step 7.4, the responder 503 may send in information element to the initiator 501 to include an indication of the new lanes for the network link. For example, in executing the control routine 522-2, the logic 520-2 may send an information element to the initiator 501 to include an indication of the new network link lanes 712. In some example, the responder 503 may send the information element as an idle flit message. In particular, the the responder 503 may send the information element during a period where no traffic is being sent over the P2P network link 200. Additionally, at step 7.4, the responder 503 may receive an acknowledgment 786, for example, and idle flit acknowledgement, from the initiator 501.

Continuing to step 7.5, the initiator 501 may approve or decline the new lanes dictated by the responder 503. In general, in executing the control routine 522-1, the logic 520-1 may send an information element to the responder 503 to include an indication of an acceptance (or a declination) of one or more lanes corresponding to a change of a width of a network link. For example, in executing the control routine 522-2, the logic 520-2 may send an information element to the initiator 501 to include an indication of whether the initiator 501 accepts or declines (e.g., the accept/decline 792) the new lanes (e.g., lanes 712, or the like) dictated by the initiator. In some example, the initiator 501 may send the information element as an idle flit message. In particular, the the initiator 501 may send the information element during a period where no traffic is being sent over the P2P network link 200. Additionally, at step 7.5, the initiator 501 may receive an acknowledgment 788, for example, and idle flit acknowledgement, from the responder 503.

Continuing to step 7.6, the responder 503 may force a recovery of the network link 200 if the initiator 501 has agreed to the new lanes dictated by the responder 503. Otherwise, the technique may return to step 7.4. For example, in executing the control routine 522-2, the logic 520-2 may force a recovery 794 of the network link 200 based on a determination that the initiator 501 has agreed to the newly dictated lanes, otherwise the logic 520-2 may return to step 7.4.

Figure 8:
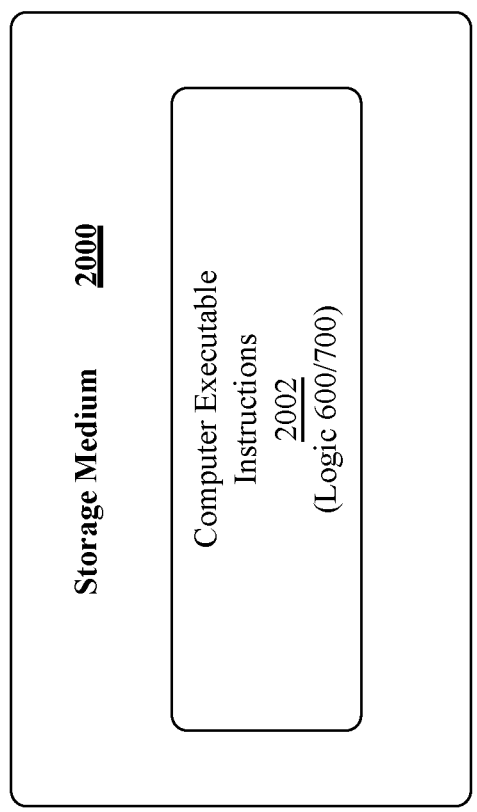
FIG. 8 illustrates an example storage medium according to an embodiment.

FIG. 8 illustrates an example storage medium 2000. The storage medium 2000 may comprise an article of manufacture. In some examples, storage medium 2000 may include any non-transitory computer readable medium or machine readable medium, such as an optical, magnetic or semiconductor storage. Storage medium 2000 may store various types of computer executable instructions 2002, such as instructions to implement techniques 600 and/or 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
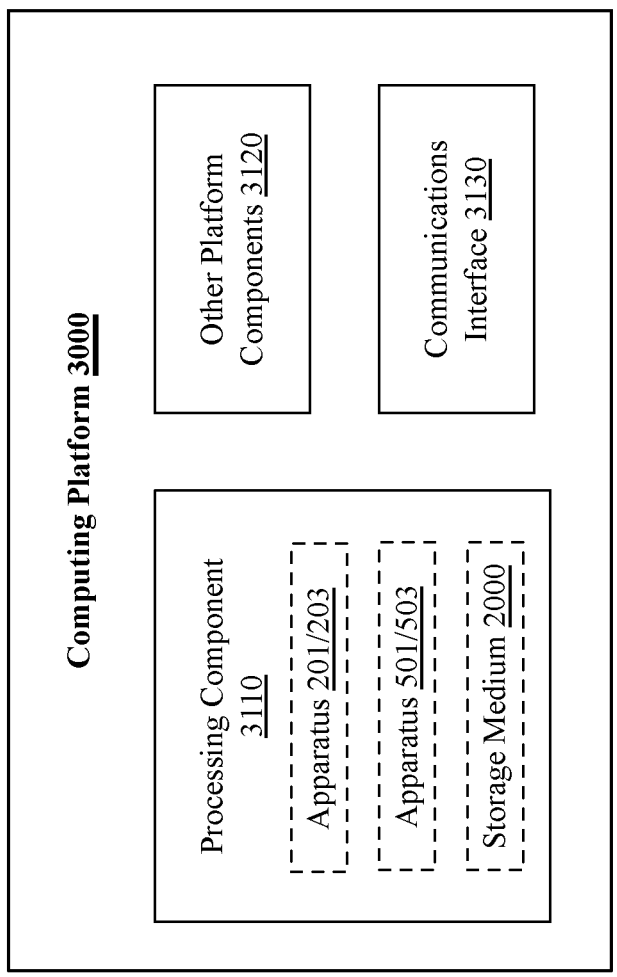
FIG. 9 illustrates a device according to an embodiment.

FIG. 9 illustrates an example computing platform 1100. In some examples, as shown in FIG. 9, computing platform 1100 may include a processing component 1110, other platform components 1120 or a communications interface 1130. According to some examples, computing platform 1100 may host management elements (e.g., policy agent, VSCA, or the like) providing secure provisioning, configuration, and de-provisioning of VNFs for a system of configurable computing resources of a cloud infrastructure such as cloud infrastructure 100 of FIG. 1.

According to some examples, processing component 1110 may execute processing operations or logic for apparatus 152, apparatus 162, and/or storage medium 1000. Processing component 1110 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1120 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1130 may include logic and/or features to support a communication interface. For these examples, communications interface 1860 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to Infiniband Architecture specification.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The detailed disclosure now turns to providing examples that pertain to further embodiments. The examples provided below are not intended to be limiting.

Example 1

A method comprising: receiving a first information element to include an indication of an acceptance of one or more lanes corresponding to a change of a width of a network link, the first information element to be received during a period of time in which network traffic may be communicated over the network link; and recovering the network link to implement the change to the width of the network link.

Example 2

The method of example 1, comprising sending a second information element before receiving the first information element, the second information element to include an indication of the one or more lanes.

Example 3

The method of example 2, comprising receiving the first information element from a network link partner and sending the second information element to the network link partner.

Example 4

The method of example 3, wherein the network link partner is a switch, a virtual switch, a host fabric interface, or a virtual host fabric interface.

Example 5

The method of example 3, comprising sending a third information element before sending the second information element, the third information element to include an indication of the sender's network link width policy and whether the sender must dictate the lanes of the network link.

Example 6

The method of example 5, comprising receiving a fourth information element in response to the third information element, the fourth information element to include an indication of the network link partner's network link width policy and whether the network link partner must dictate the lanes of the network link.

Example 7

The method of example 3, comprising receiving a third information element before sending the second information element, the third information element to include an indication of the network link partner's network link width policy and whether the network link partner must dictate the lanes of the network link.

Example 8

The method of example 7, comprising sending a fourth information element in response to the third information element, the fourth information element to include an indication of the sender's network link width policy and whether the sender must dictate the lanes of the network link.

Example 9

The method of any one of examples 6 or 8, the first information element, the second information element, the third information element, and the fourth information comprising idle flit messages.

Example 10

The method of example 9, the idle messages to be sent or received during periods of time in which network traffic may be communicated over the network link.

Example 11

The method of example 9, comprising: sending a first idle flit acknowledgment corresponding to the first information element; receiving a second idle flit acknowledgment corresponding to the second information element; receiving a third idle flit acknowledgment corresponding to the third information element; and sending a fourth idle flit acknowledgment corresponding to the fourth information element.

Example 12

The method of example 9, comprising: sending a first idle flit acknowledgment corresponding to the first information element; receiving a second idle flit acknowledgment corresponding to the second information element; sending a third idle flit acknowledgment corresponding to the third information element; and receiving a fourth idle flit acknowledgment corresponding to the fourth information element.

Example 13

The method of example 6, comprising receiving a fifth information element before sending the third information element, the fifth information element to include an indication to change the width of the network link.

Example 14

The method of example 13, comprising receiving the fifth information element from a host fabric manager or a power manager.

Example 15

The method of example 1, recovering the network link comprises initiating a soft recovery of the network link.

Example 16

At least one machine readable medium comprising a plurality of instructions that in response to being executed by a secure execution partition of circuitry located with a cloud infrastructure cause the circuitry to carry out a method according to any one of examples 1 to 15.

Example 17

An apparatus comprising means for performing the methods of any one of examples 1 to 15.

Example 18

An apparatus comprising: logic, at least a portion of which is implement in hardware, the logic to: receive a first information element to include an indication of an acceptance of one or more lanes corresponding to a change of a width of a network link, the first information element to be received during a period of time in which network traffic may be communicated over the network link; and recover the network link to implement the change to the width of the network link.

Example 19

The apparatus of example 18, the logic to send a second information element before receiving the first information element, the second information element to include an indication of the one or more lanes.

Example 20

The apparatus of example 19, the logic to receive the first information element from a network link partner and send the second information element to the network link partner.

Example 21

The apparatus of example 20, wherein the network link partner is a switch, a virtual switch, a host fabric interface, or a virtual host fabric interface.

Example 22

The apparatus of example 20, the logic to send a third information element before sending the second information element, the third information element to include an indication of the sender's network link width policy and whether the sender must dictate the lanes of the network link.

Example 23

The apparatus of example 22, the logic to receive a fourth information element in response to the third information element, the fourth information element to include an indication of the network link partner's network link width policy and whether the network link partner must dictate the lanes of the network link.

Example 24

The apparatus of example 20, the logic to receive a third information element before sending the second information element, the third information element to include an indication of the network link partner's network link width policy and whether the network link partner must dictate the lanes of the network link.

Example 25

The apparatus of example 24, the logic to send a fourth information element in response to the third information element, the fourth information element to include an indication of the sender's network link width policy and whether the sender must dictate the lanes of the network link.

Example 26

The apparatus of any one of examples 23 or 25, the first information element, the second information element, the third information element, and the fourth information comprising idle flit messages.

Example 27

The apparatus of example 26, the idle messages to be sent or received during periods of time in which network traffic may be communicated over the network link.

Example 28

The apparatus of example 26, the logic to: send a first idle flit acknowledgment corresponding to the first information element; receive a second idle flit acknowledgment corresponding to the second information element; receive a third idle flit acknowledgment corresponding to the third information element; and send a fourth idle flit acknowledgment corresponding to the fourth information element.

Example 29

The apparatus of example 26, the logic to: send a first idle flit acknowledgment corresponding to the first information element; receive a second idle flit acknowledgment corresponding to the second information element; send a third idle flit acknowledgment corresponding to the third information element; and receive a fourth idle flit acknowledgment corresponding to the fourth information element.

Example 30

The apparatus of example 23, the logic to receive a fifth information element before sending the third information element, the fifth information element to include an indication to change the width of the network link.

Example 31

The apparatus of example 30, the logic to receive the fifth information element from a host fabric manager or a power manager.

Example 32

The apparatus of example 19, the logic to initiate a soft recovery of the network link.

Example 33

At least one machine readable medium comprising a plurality of instructions that in response to being executed by a networked element in a cloud infrastructure cause the networked element to: receive a first information element to include an indication of an acceptance of one or more lanes corresponding to a change of a width of a network link, the first information element to be received during a period of time in which network traffic may be communicated over the network link; and recover the network link to implement the change to the width of the network link.

Example 34

The at least one machine readable medium of example 33, the instructions to further cause the networked element to send a second information element before receiving the first information element, the second information element to include an indication of the one or more lanes.

Example 35

The at least one machine readable medium of example 34, the instructions to further cause the networked element to receive the first information element from a network link partner and send the second information element to the network link partner.

Example 36

The at least one machine readable medium of example 35, wherein the network link partner is a switch, a virtual switch, a host fabric interface, or a virtual host fabric interface.

Example 37

The at least one machine readable medium of example 35, the instructions to further cause the networked element to send a third information element before sending the second information element, the third information element to include an indication of the sender's network link width policy and whether the sender must dictate the lanes of the network link.

Example 38

The at least one machine readable medium of example 37, the instructions to further cause the networked element to receive a fourth information element in response to the third information element, the fourth information element to include an indication of the network link partner's network link width policy and whether the network link partner must dictate the lanes of the network link.

Example 39

The at least one machine readable medium of example 35, the instructions to further cause the networked element to receive a third information element before sending the second information element, the third information element to include an indication of the network link partner's network link width policy and whether the network link partner must dictate the lanes of the network link.

Example 40

The at least one machine readable medium of example 39, the instructions to further cause the networked element to send a fourth information element in response to the third information element, the fourth information element to include an indication of the sender's network link width policy and whether the sender must dictate the lanes of the network link.

Example 41

The at least one machine readable medium of any one of examples 38 or 40, the first information element, the second information element, the third information element, and the fourth information comprising idle flit messages.

Example 42

The at least one machine readable medium of example 41, the idle messages to be sent or received during periods of time in which network traffic may be communicated over the network link.

Example 43

The at least one machine readable medium of example 41, the instructions to further cause the networked element to: send a first idle flit acknowledgment corresponding to the first information element; receive a second idle flit acknowledgment corresponding to the second information element; receive a third idle flit acknowledgment corresponding to the third information element; and send a fourth idle flit acknowledgment corresponding to the fourth information element.

Example 44

The at least one machine readable medium of example 41, the instructions to further cause the networked element to: send a first idle flit acknowledgment corresponding to the first information element; receive a second idle flit acknowledgment corresponding to the second information element;

send a third idle flit acknowledgment corresponding to the third information element; and receive a fourth idle flit acknowledgment corresponding to the fourth information element.

Example 45

The at least one machine readable medium of example 38, the instructions to further cause the networked element to receive a fifth information element before sending the third information element, the fifth information element to include an indication to change the width of the network link.

Example 46

The at least one machine readable medium of example 45, the instructions to further cause the networked element to receive the fifth information element from a host fabric manager or a power manager.

Example 47

The at least one machine readable medium of example 33, the instructions to further cause the networked element to initiate a soft recovery of the network link.

Example 48

An apparatus comprising: means to receive a first information element to include an indication of an acceptance of one or more lanes corresponding to a change of a width of a network link, the first information element to be received during a period of time in which network traffic may be communicated over the network link; and means to recover the network link to implement the change to the width of the network link.

Example 49

The apparatus of example 48, comprising means to send a second information element before receiving the first information element, the second information element to include an indication of the one or more lanes.

The invention claimed is:

1. A method comprising:
receiving, by a first network link partner from a second network link partner, a first information element in an idle message to include indications of an acceptance of one or more lanes corresponding to a change of a width of a network link, a network link width policy of the second network link partner, and whether the second network link partner must dictate the lanes of the network link, the first information element to be received during a period of time in which network traffic may be communicated over the network link, the first information element received responsive to a second information element sent by the first network link partner to the second network link partner, the second information element to indicate the one or more lanes, a network link width policy of the first network link partner, and whether the first network link partner must dictate the lanes of the network link; and
recovering the network link to implement the change to the width of the network link.

2. The method of claim 1, comprising sending, by the first network link partner, the second information element to the second network link partner before receiving the first information element.

3. The method of claim 2, comprising sending, by the first network link partner, the second information element to the second network link partner.

4. The method of claim 3, wherein the first and second network link partners are a switch, a virtual switch, a host fabric interface, or a virtual host fabric interface.

5. The method of claim 3, comprising receiving, by the first network link partner, a third information element, the first information element to include an indication to change the width of the network link.

6. The method of claim 5, comprising receiving the third information element from a host fabric manager or a power manager.

7. The method of claim 1, the first information element and the second information element comprising idle flit messages.

8. The method of claim 7, the idle messages to be sent or received during periods of time in which network traffic may be communicated over the network link.

9. The method of claim 7, comprising:
sending, by the first network link partner to the second network link partner, a first idle flit acknowledgment corresponding to the first information element; and
receiving, by the first network link partner from the second network link partner, a second idle flit acknowledgment corresponding to the second information element.

10. An apparatus comprising:
a processor; and
a memory storing instructions which when executed by the processor cause the processor to:
receive, by a first network link partner from a second network link partner, a first information element in an idle message to include indications of an acceptance of one or more lanes corresponding to a change of a width of a network link, a network link width policy of the second network link partner, and whether the second network link partner must dictate the lanes of the network link, the first information element to be received during a period of time in which network traffic may be communicated over the network link, the first information element received responsive to a second information element sent by the first network link partner to the second network link partner, the second information element to indicate the one or more lanes, a network link width policy of the first network link partner, and whether the first network link partner must dictate the lanes of the network link; and
recover the network link to implement the change to the width of the network link.

11. The apparatus of claim 10, the memory storing instructions which when executed by the processor cause the processor to send, by the first network link partner, the second information element to the second network link partner before receiving the first information element.

12. The apparatus of claim 11, wherein the first and second network link partners are a switch, a virtual switch, a host fabric interface, or a virtual host fabric interface.

13. The apparatus of claim 12, the first information element and the second information element comprising idle flit messages, the idle flit messages sent or received during periods of time in which network traffic may be communicated over the network link.

14. The apparatus of claim 12, the memory storing instructions which when executed by the processor cause the processor to receive a network link policy change information element to include an indication to change the width of the network link, the network link policy change information element to be received from a host fabric manager or a power manager.

15. At least one non-transitory machine readable medium comprising a plurality of instructions that in response to being executed by a processor cause the processor to:
receive, by a first network link partner from a second network link partner, a first information element in an idle message to include indications of an acceptance of one or more lanes corresponding to a change of a width of a network link, a network link width policy of the second network link partner, and whether the second network link partner must dictate the lanes of the network link, the first information element to be received during a period of time in which network traffic may be communicated over the network link, the first information element received responsive to a second information element sent by the first network link partner to the second network link partner, the second information element to indicate the one or more lanes, a network link width policy of the first network link partner, and whether the first network link partner must dictate the lanes of the network link; and
recover the network link to implement the change to the width of the network link.

16. The at least one non-transitory machine readable medium of claim 15, the instructions to further cause the processor to:
send, by the first network link partner, the second information element to the second network link partner before receiving the first information element.

17. The at least one non-transitory machine readable medium of claim 16, the instructions to further cause the processor to: send, by the first network link partner, the second information element to the second network link partner.

18. The at least one non-transitory machine readable medium of claim 17, wherein the first and second network link partners are a switch, a virtual switch, a host fabric interface, or a virtual host fabric interface.

19. The at least one non-transitory machine readable medium of claim 15, the instructions to further cause the processor to receive a network link policy change information element, the network link policy change information element to include an indication to change the width of the network link, the network link policy change information element to be received from a host fabric manager or a power manager.

* * * * *